United States Patent [19]
Brown et al.

[11] Patent Number: 5,505,556
[45] Date of Patent: Apr. 9, 1996

[54] CLAMPING MECHANISM

[75] Inventors: Gerald A. Brown, Trenton; William M. Faitel, Oxford, both of Mich.

[73] Assignee: Western Atlas, Inc., Hebron, Ky.

[21] Appl. No.: 303,459

[22] Filed: Sep. 9, 1994

[51] Int. Cl.⁶ ............................. F16M 11/04; B23Q 3/02
[52] U.S. Cl. .......................... 403/322; 248/510; 248/550; 248/681; 403/24; 403/321; 403/323
[58] Field of Search ..................................... 219/158, 161; 248/500, 510, 550, 680, 681; 403/12, 20, 24, 27, 41, 321, 322, 323

[56] References Cited

U.S. PATENT DOCUMENTS

| | | | |
|---|---|---|---|
| 3,796,985 | 3/1974 | Weber | 339/91 R |
| 4,270,036 | 5/1981 | Zollinger | 219/161 X |
| 4,534,234 | 8/1985 | Cosenza | 74/89.15 |
| 4,718,632 | 1/1988 | Meineke | 248/681 |

Primary Examiner—Kenneth J. Dorner
Assistant Examiner—Andrea Chop
Attorney, Agent, or Firm—Barnes, Kisselle, Raisch, Choate, Whittemore & Hulbert

[57] ABSTRACT

Clamping mechanism for clamping a plate to a base comprises an arm having a clamp head on one end and a sleeve slidably receiving the arm. The sleeve is mounted for rotation on an axis perpendicular to the arm. A drive is provided to rotate the sleeve from a first position to a second position in which the arm is disposed with its head in position to clamp the plate to the base and to slide the arm through the sleeve when the sleeve is in the second position to draw the head tightly against the plate and clamp it to the base.

11 Claims, 4 Drawing Sheets

CLAMPING MECHANISM

FIELD OF THE INVENTION

This invention relates generally to a clamping mechanism and more particularly to a mechanism for rapidly and accurately clamping and unclamping a carrier for transporting welding equipment or the like.

BACKGROUND OF THE INVENTION

In the welding of various components such as auto body parts, it is essential that the equipment be rapidly and accurately positioned. The welding equipment is moved into position on a carrier and unless the carrier is properly located, the welding may not be performed with the high degree of accuracy required of such operations.

SUMMARY OF THE INVENTION

In accordance with this invention, a mechanism for clamping a carrier in fixed position includes a clamp arm having a clamp head on one end. The clamp arm is slidably received in a sleeve supported for rotation on an axis perpendicular to the arm. A drive is provided for rotating the sleeve and thereby swinging the clamp arm so that its head is in position to clamp the carrier to a base and then sliding the clamp arm through the sleeve to draw the head tightly against the carrier and clamp it to the base.

Preferably, the drive comprises a lever to which one end of the clamp arm is pivoted, a crank which turns on the axis of rotation of the sleeve, a sliding pivotal connection between the lever and crank, and a power unit for rotating the crank.

Preferably, the head is spring mounted on the clamp arm so that when the head is drawn tightly against the carrier, the carrier is resiliently clamped by the head with a yielding pressure.

In addition, it is desirable to move the clamp arm relatively rapidly to the point where movement of the carrier commences, and thereafter increase the mechanical advantage to cause the clamp arm to draw the carrier tightly against the base.

One object of the invention is to provide a clamping mechanism having the foregoing features.

Another object is to provide a clamping mechanism which is composed of a relatively few simple parts, is rugged and durable in use, and capable of being readily and inexpensively manufactured and assembled.

BRIEF DESCRIPTION OF THE DRAWINGS

These and other objects, features and advantages of the invention will become more apparent as the following description proceeds, especially when considered with the accompanying drawings wherein.

DETAILED DESCRIPTION

Figure 1:
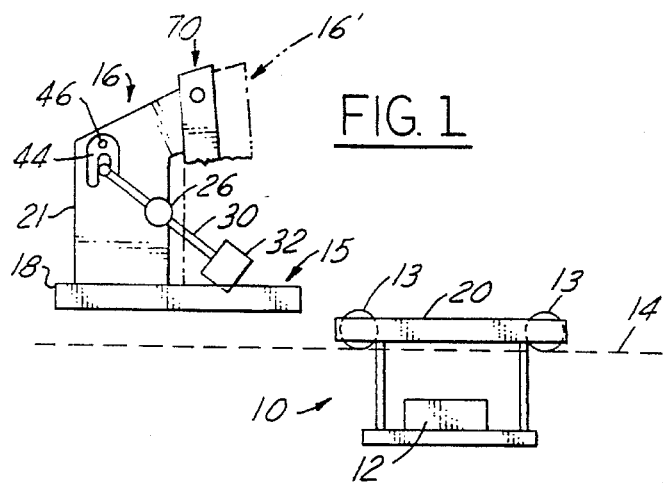
FIG. 1 is a diagrammatic view of a carrier for welding equipment shown moving toward a welding station where the clamping mechanism of this invention is provided.
Figure 4:
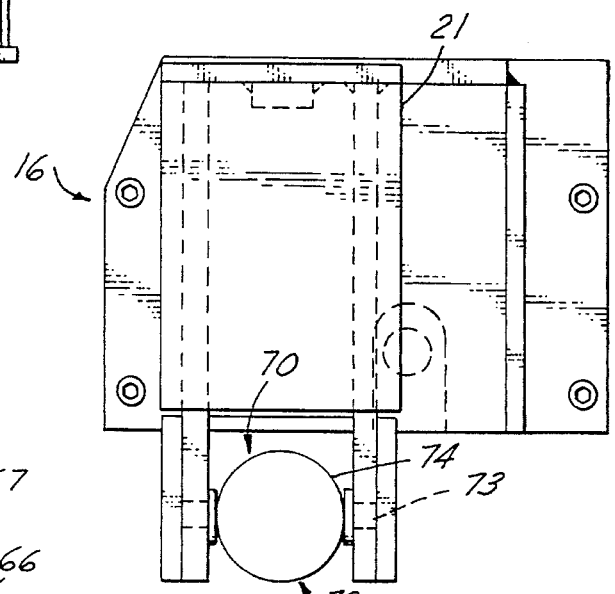
FIG. 4 is a top view.

Referring now more particularly to the drawings, a carrier 10 is diagrammatically shown in FIG. 1 for supporting welding equipment 12, although in a broader sense the carrier may be of general utility for supporting and transporting equipment of any kind. The carrier 10 has rollers 13 movable along a horizontal track 14 to a welding station 15. At the welding station, clamping mechanism 16 embodying this invention is provided to clamp the carrier in fixed position with respect to a base 18. In this instance, the base 18 is shown as a flat horizontal plate and the top of the carrier is in the form of a flat horizontal plate 20 which is adapted to be clamped to the bottom of the base plate 18. To accurately locate the carrier in position for clamping, pucks or locator pins (not shown) may be provided on the base plate 18 which enter sockets in the flat horizontal plate 20 of the carrier.

The clamping mechanism 16 comprises a frame 21 mounted on the base plate 18. The frame 21 has parallel side plates 22 and 23. A horizontal shaft 24 extends between and is journalled in the side plates 22, 23. The shaft 24 has an integral enlargement in the form of a sleeve 26 provided with a transverse through passage or bore 28 which is perpendicular to the axis of shaft 24. An elongated clamp arm 30 slidably extends through bore 28 and has an enlarged head 32 on the outer end.

Figure 7:
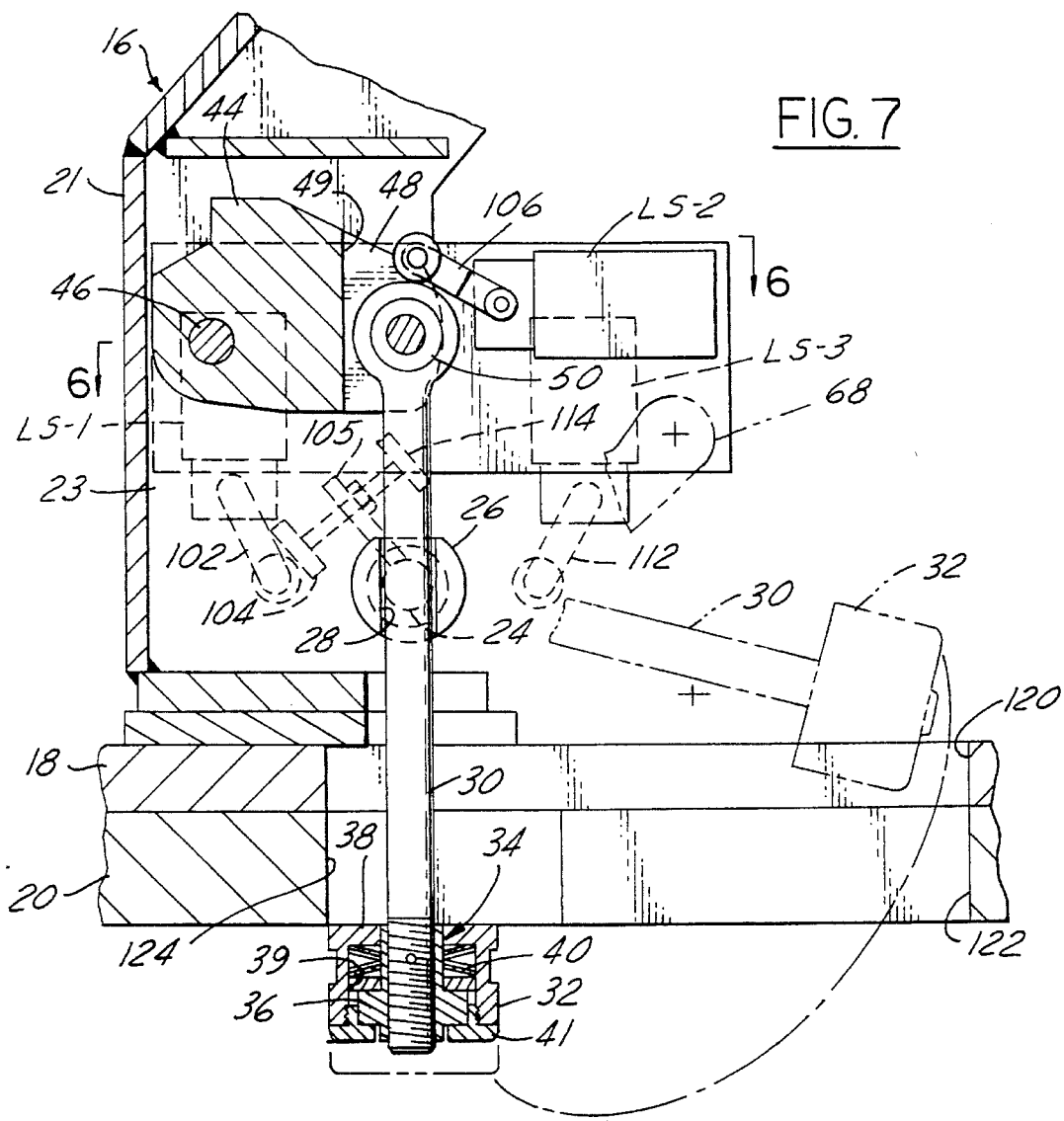
FIG. 7 is a sectional view taken on the line 7—7 in FIG. 3.

As seen in FIG. 7, a nut 34 is threaded on the outer end of clamp arm 30. The nut has a radially outwardly extending annular flange 36. The head 32 is in the form of a hollow cylinder or shell which encircles the nut 34 and the nut flange 36, and at the inner end has a radially inwardly extending flange 38 which overlaps the nut flange 36. The head 32 and head flange 38 cooperate with the nut 34 and nut flange 36 to define an annular chamber 39. Belville spring washers 40 are disposed in chamber 39, compressed between the head flange 38 and the nut flange 36 to urge the head inwardly away from the outer end of the clamp arm. A retainer ring 41 is threaded on the outer end of the head 32 and engages the outer side of nut flange 36 to limit the distance the head can be moved inwardly by the force of the spring 40.

A lever 44 is secured to a shaft 46 which is spaced from and parallel to shaft 24. The shaft 46 has its opposite ends journalled for rotation in the side plates 22 and 23 of the frame. The lever 44 has axially spaced arms 47 and 48 extending radially outwardly from shaft 46 and defining a slot 49 between the arms. The upper end of the clamp arm 30 is pivotally connected to the lever arm 44 by a pivot pin 50 journalled in the arms 47, 48 and extending parallel to the shaft 46.

Figure 5:
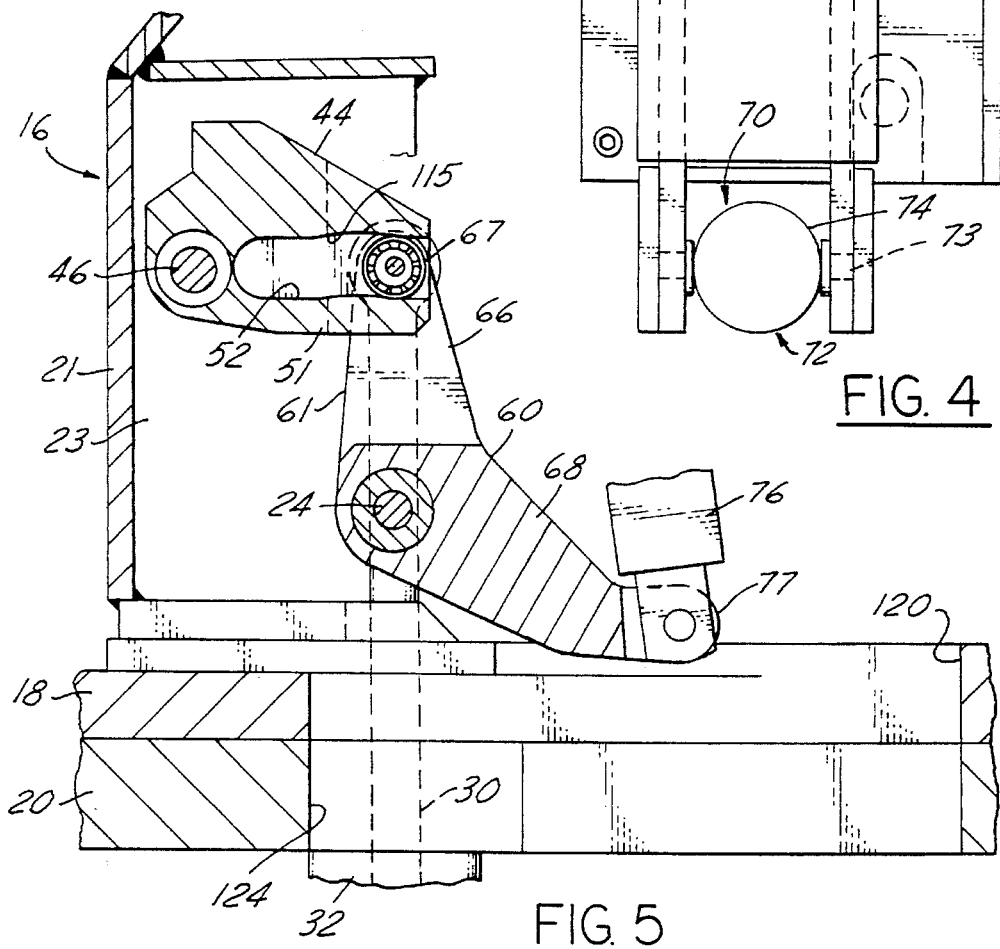
FIG. 5 is a sectional view taken on the line 5—5 in FIG. 3.

For driving the clamp arm, the lever 44 has a third arm 51 spaced to one side of arms 47 and 48 which projects radially outwardly from the shaft 46. Arm 51 has a generally radially extending slot 52 which is open at the outer end and has the contour best shown in FIG. 5.

A bell crank 60 is rigidly secured to shaft 24 at one side of sleeve 26. Crank 60 has one arm 61 which is bifurcated to provide prongs 64 and 66 that straddle arm 51 of lever 44.

A roller 67 between the prongs 64 and 66 is journalled on the prongs 64 and 66 for rotation on an axis parallel to shaft 46. Roller 67 has a rotatable sliding fit in slot 52 of lever arm 51. The bell crank 60 has a second arm 68, the outer end of which is pivoted to a drive for the clamping mechanism that comprises a power unit 70.

The power unit 70 may be of various different constructions but in the present instance is a linear actuator with a ball and screw assembly 72 driven by a reversible electric stepper motor 74. An actuator rod 76 is pivoted at 77 to the outer end of crank arm 68. The assembly 72 is pivoted to the frame 21 where indicated at 73. When the actuator rod 76 is extended, the bell crank 60 is turned clockwise from the dotted line position of FIG. 2 to the clamped solid line position. This movement of the bell crank 60 turns lever 44 which, through the sliding pivotal connection between slot 52 and roller 67, turns the sleeve 26 and hence the clamp arm 30. The upper end of the clamp arm 30 is pivoted to lever 44 so that rotation of lever 44 also causes the clamp arm 30 to slide in the bore 28 of sleeve 26. This rotation of lever 44 produces a combined turning and longitudinal sliding movement of arm 30 from the unclamped or retracted position shown in dotted lines to the clamped position shown in solid lines.

Figure 2:
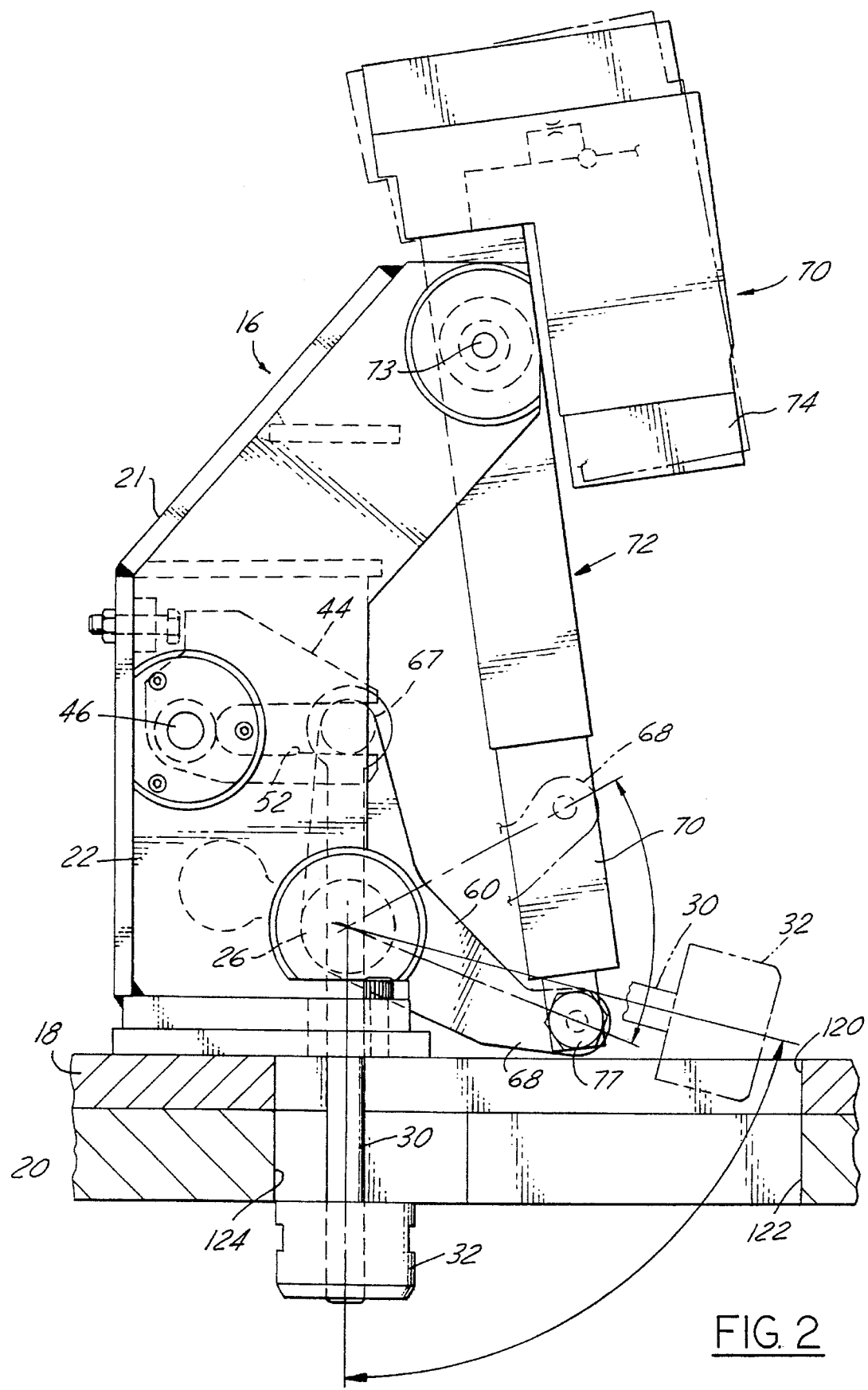
FIG. 2 is a side elevational view of the clamping mechanism of this invention, showing the clamp arm in the clamped position in solid lines and in an unclamped position in phantom lines.
Figure 3:
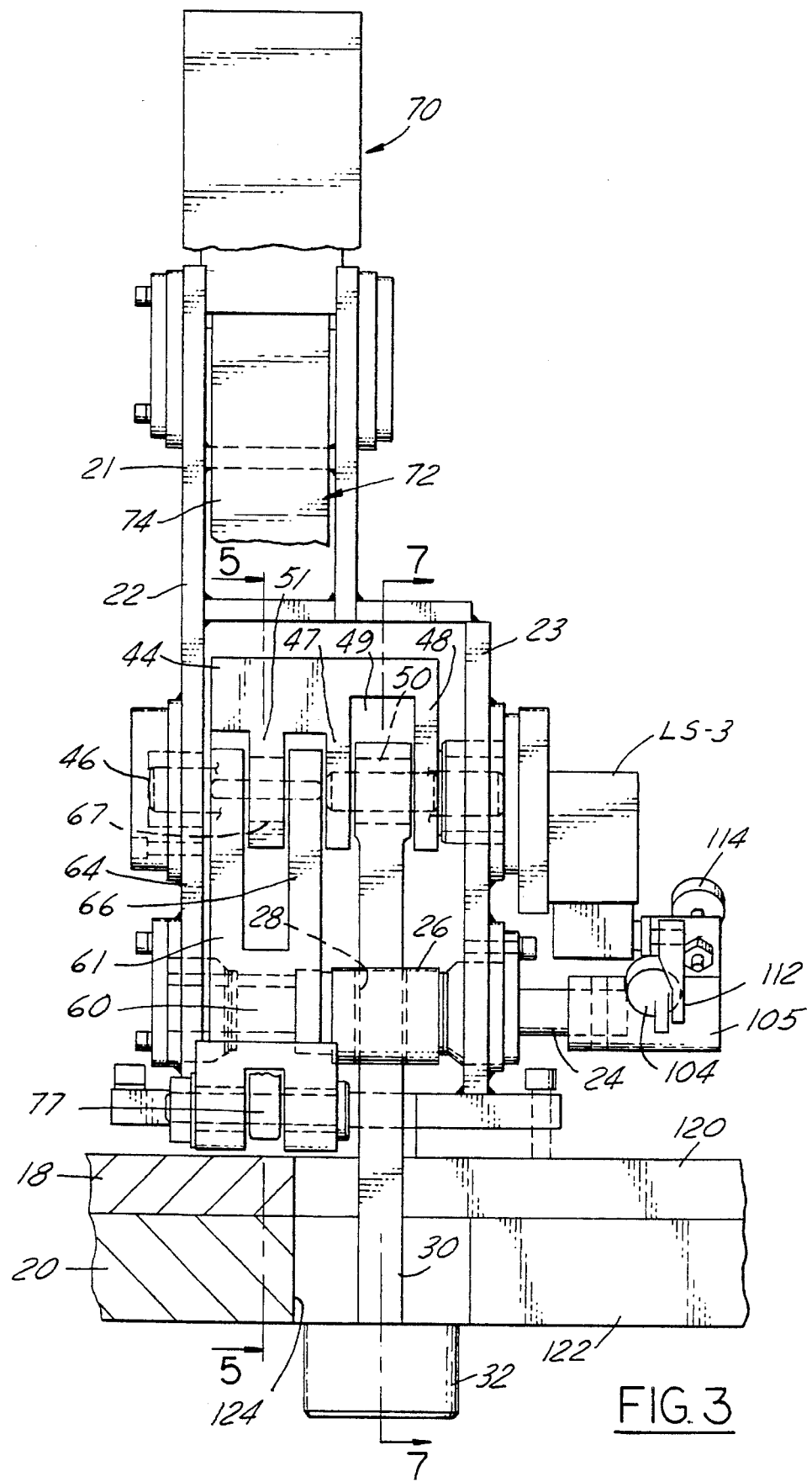
FIG. 3 is a view of the clamping mechanism as seen from the right in FIG. 2, with parts broken away.
Figure 6:
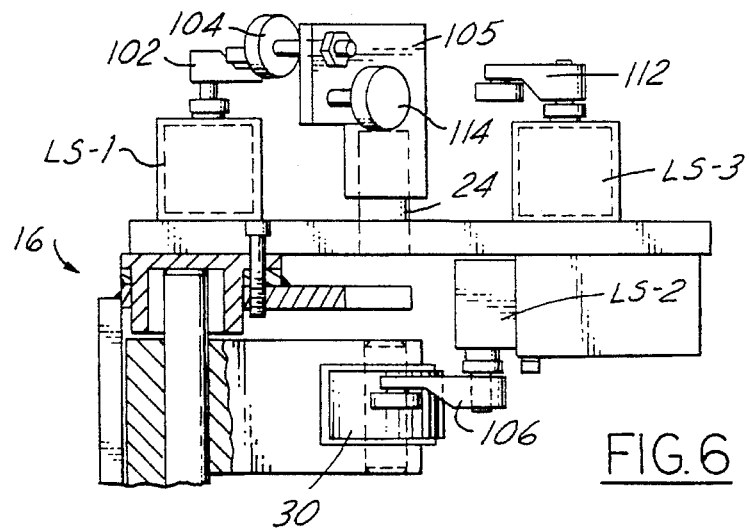
FIG. 6 is a sectional view taken on the line 6—6 in FIG. 7.

When the clamp arm 30 has been fully retracted to the dotted line position of FIGS. 2 and 7, a limit switch LS-1 is operated to stop the operation of the power unit. This limit switch LS-1 has an operating lever 102. An actuator 104 is mounted on a bracket 105 which is secured to and turns with the shaft 24. When the clamp arm 30 is in the fully retracted or unclamped position, the actuator 104 engages the operating lever 102 of limit switch LS-1.

A second limit switch LS-2 is operated to stop the power unit 70 when the clamp arm 30 is swung to the fully clamped position shown in solid lines in FIGS. 2 and 7. The limit switch LS-2 has an operating lever 106 adapted to be engaged by the upper or pivoted end of the clamp arm 30 and operated thereby, to stop the operation of the power unit.

The movement of the clamp arm 30 during the last portion of its movement to fully clamped position is slowed due to the curve in the contour of the slot 52 in arm 51 where indicated at 115. The curved slot contour 115 increases the mechanical advantage and causes the clamp arm 30 to slide longitudinally in the bore of sleeve 26 and clamp head 32 to move upwardly from the dotted line position of FIG. 7 to the solid line position into clamping engagement with the carrier plate 20.

It should be understood that the clamping mechanism 16 may be used with other similar clamping mechanisms such as the clamping mechanism 16' partially shown in phantom in FIG. 1. All such clamping mechanisms should operate to move and clamp the carrier plate 20 at the same time. For this purpose, a third limit switch LS-3 is provided which is operated when the clamp arm 30 is swinging towards the clamped position and preferably as the head engages the carrier just before the clamp begins to lift the carrier. Limit switch LS-3 has an operating lever 112 adapted to be engaged and operated by an actuator 114 on bracket 105. All clamping mechanisms will have similar limit switches LS-3. Operation of each limit switch LS-3 will stop the clamp drive to await signals from the other clamping mechanisms to make sure that all clamps are in position to lift simultaneously the carrier to balance and distribute the total load on all clamps. When all limit switches LS-3 are tripped, the drives of all clamp mechanisms are simultaneously energized to simultaneously lift and clamp the carrier. This prevents damage to the clamps and cocking of the carrier.

The base plate 18 has an elongated opening or slot 120 which is wider than the diameter of both the clamp arm 30 and the clamp head 32. The plate 20 of the carrier 10 has an elongated opening or slot 122 which is similar in shape to slot 120, except that it has a relatively narrow portion 124 at one end which is of a width less than the diameter of the clamp head 32 but greater than the clamp arm 30. When the clamp is in the raised position shown in dotted lines in FIGS. 2 and 7, the entire clamp, including head 32, is above the bottom of plate 18 so as not to interfere with movement of the carrier.

In use, the carrier 10 is moved along tracks 14 to the welding station 15 to a position such that the openings or slots 120 and 122 in base plate 18 and carrier plate 20 are in substantial registration. The power unit 70 is operated to extend the actuator rod 76 and thereby turn the bell crank 60 clockwise from the dotted line position in FIGS. 2 and 7 toward the solid line position. The crank 60 turns lever 44 which, through the sliding pivotal connection between slot 52 and roller 62, turns sleeve 26 and clamp arm 30 clockwise. The pivotal connection of the lever 44 to clamp arm 30 also causes the clamp arm to slide through sleeve 26 when the lever 44 rotates. The clamp arm 30 and head 32 move downwardly through the registering openings 120 and 122 at this time.

During movement towards clamped position, the clamp arm 30 reaches a point where it is almost vertical, but the clamp head 32 is spaced below carrier plate 20 as shown in dotted lines in FIG. 7. The movement of the clamp arm 30 slows at this point due to the shape of the curved portion 115 of slot 52 in arm 51, increasing the mechanical advantage and drawing the clamp arm upwardly to the fully clamped position at which point limit switch LS-2 is operated by the upper end of clamp arm 30. In this position, the clamp arm 30 is in the narrow portion 124 of slot 122 and the head 32 is drawn up tightly against the carrier plate 20 with resilient clamping force. The procedure is reversed to unclamp the carrier plate.

The invention claimed is:

1. Clamping mechanism for clamping a member in a fixed position comprising:

a base, a frame, an elongated clamp arm having opposite ends, a clamp head on one end of said clamp arm, a sleeve slidably receiving said clamp arm, said sleeve being carried by said frame for rotation about an axis perpendicular to the longitudinal axis of said clamp arm, and a drive for rotating said sleeve from a first position to a second position in which said clamp arm is disposed with its clamp head in a position to clamp the member to the base and for sliding said clamp arm with respect to said sleeve when the sleeve is in said second position to draw said clamp head tightly against the member and clamp it to the base, said drive comprising a lever pivotally carried by said frame, a pivotal connection between said lever and the end of the clamp arm opposite the end having the clamp head, and a power unit operably connected to said lever for pivoting said lever.

2. Clamping mechanism as defined in claim 1, and further including control means operative to cause rotation of said sleeve from said first position to said second position relatively rapidly until said clamp arm is disposed with its clamp head in a position to clamp the member to the base and thereafter to slide said clamp arm relative to said sleeve slowly until said clamp head is drawn tightly against the member as aforesaid.

3. Clamping mechanism as defined in claim 1, and further including a spring connecting said clamp head to said clamp arm such that said clamp head when drawn tightly against the member as aforesaid resiliently clamps the member with a yielding pressure.

4. Clamping mechanism as defined in claim 1, wherein said power unit is operably connected to said lever by a crank pivoted to said frame.

5. Clamping mechanism for clamping a member in a fixed position comprising:

a base, a frame, an elongated clamp arm having opposite ends, a clamp head on one end of said clamp arm, a sleeve slidably receiving said clamp arm, said sleeve being carried by said frame for rotation about an axis perpendicular to the longitudinal axis of said clamp arm, and a drive for rotating said sleeve from a first position to a second position in which said clamp arm is disposed with its clamp head in a position to clamp the member to the base and for sliding said clamp arm with respect to said sleeve when the sleeve is in said second position to draw said clamp head tightly against the member and clamp it to the base, wherein said drive comprises a lever pivotally carried by said frame, and pivotally connected with said clamp arm adjacent the end of the clamp arm opposite the end having the clamp head, a crank mounted for rotation on the axis of rotation of said sleeve, a sliding pivotal connection between said lever and said crank, and said drive rotating said crank.

6. Clamping mechanism as defined in claim 5, wherein said sliding pivotal connection comprises a slot in said lever and a pivot pin on said crank slidably received in said slot.

7. Clamping mechanism as defined in claim 6, and further including control means operative to cause rotation of said lever from a first position to a second position relatively rapidly until said clamp arm is disposed with its clamp head in a position to clamp the member to the base and thereafter to rotate said lever relatively slowly until said clamp head is drawn tightly against the member as aforesaid.

8. Clamping mechanism as defined in claim 7, and further including a spring connecting said clamp head to said clamp arm such that said clamp head when drawn tightly against the member as aforesaid resiliently clamps the member with a yielding pressure.

9. Clamping mechanism as defined in claim 8, wherein said base is in the form of a flat base plate and the member is in the form of a flat plate member adapted to be positioned in surface-to-surface relation with said base plate when clamped thereto as aforesaid, and openings are in said base plate and plate member for clearing said clamp arm and clamp head when said clamp arm is rotated with said sleeve from said first position to said second position.

10. Clamping mechanism as defined in claim 9, wherein said clamp head is larger in diameter than said clamp arm, the opening in the plate member having a relatively wide portion adapted to clear both said clamp arm and said clamp head and a relatively narrow portion of a width greater than the diameter of said clamp arm to clear said clamp arm but less than the diameter of said clamp head, said clamp arm in said second position being adapted to extend through said relatively narrow portion of said opening so that said clamp head can apply clamping pressure on the plate member on opposite sides of said relatively narrow portion.

11. Two clamping mechanisms for clamping a member in a fixed position, each of the clamping mechanisms comprising:

a base, a frame, an elongated clamp arm having opposite ends, a clamp head on one end of said clamp arm, a sleeve slidably receiving said clamp arm, means mounting said sleeve on said frame for rotation about an axis perpendicular to the longitudinal axis of said clamp arm, and a drive for rotating said sleeve from a first position to a second position in which said clamp arm is disposed with its clamp head in a position to clamp the member to the base and for sliding said clamp arm with respect to said sleeve when the sleeve is in said second position to draw said clamp head tightly against the member and clamp it to the base, wherein control means is provided for the drive of each clamping mechanism operative to de-activate the drive thereof when the clamp head is in a near-clamping position before being drawn tightly against the member and to signal the control means for the drive of the other clamping mechanism to indicate the near-clamping position of said clamp head, the control means of each clamping mechanism operative to re-activate the drive thereof upon receipt of the signal from the control means for the other clamping mechanism so that the clamp heads of both clamping mechanisms are simultaneously drawn tightly against the member.

* * * * *